March 1, 1932.   N. H. SANDBERG   1,847,265
SORTING DEVICE FOR WASTE PAPER
Filed April 20, 1929   2 Sheets-Sheet 1

Inventor
Nels H. Sandberg
By Caswell & Lagaard Attorneys

March 1, 1932.  N. H. SANDBERG  1,847,265
SORTING DEVICE FOR WASTE PAPER
Filed April 20, 1929   2 Sheets-Sheet 2

Inventor
Nels H. Sandberg
By Canwell & Lagaard Attorneys

Patented Mar. 1, 1932

1,847,265

UNITED STATES PATENT OFFICE

NELS H. SANDBERG, OF MINNEAPOLIS, MINNESOTA, ASSIGNOR TO WALDORF PAPER PRODUCTS COMPANY, OF ST. PAUL, MINNESOTA, A CORPORATION OF MINNESOTA

SORTING DEVICE FOR WASTE PAPER

Application filed April 20, 1929. Serial No. 356,727.

My invention relates to sorting devices for waste paper and has for its object to provide a device whereby waste paper may be rapidly and effectively sorted.

Another object of the invention resides in providing an endless carrier and in further providing side walls enclosing said carrier, and forming a space for the housing of an appreciable quantity of paper available to the sorter for sorting.

A still further object of the invention resides in disposing across said side walls at the receiving end of said carrier an inclined end wall forming a chute for directing the paper upon said carrier.

A feature of the invention resides in employing an angular brake for controlling the feeding of paper upon said carrier.

Another object of the invention resides in providing a table at the discharge end of said carrier and between said side walls for supporting the paper delivered by said carrier.

An object of the invention resides in forming said table with a perforate top through which dust and other small waste substances may be readily passed for the purpose of cleaning the paper during the sorting thereof.

A feature of the invention resides in providing said table with a depending frame adapted to receive said perforate top, and in further providing a bottom at the lowermost portion of said frame forming in conjunction therewith a receptacle for the reception of the substances passing through said perforate top.

Another object of the invention resides in providing a conveyor positioned beneath said table and extending through the side walls of said sorters and traveling at right angles to the said carrier.

A feature of the invention resides in slidably mounting the bottom of said receptacle so as to permit of discharging the substances within said receptacle upon said conveyor.

An object of the invention resides in installing the sorters adjacent one another and in spacing the adjacent walls thereof, and in further running said conveyor successively beneath the tables of the various sorters, and in providing an additional conveyor disposed in parallel relation with said first named conveyor for removing sorted paper from the sorters.

An object of the invention resides in providing chutes between the adjacent side walls of adjoining sorters, said chutes being inclined forwardly of the sorters and adapted to feed the sorted waste paper upon the conveyors.

Other objects of the invention reside in the details of construction thereof, and in the novel combination and arrangement of parts hereinafter illustrated or described.

Figure 1:
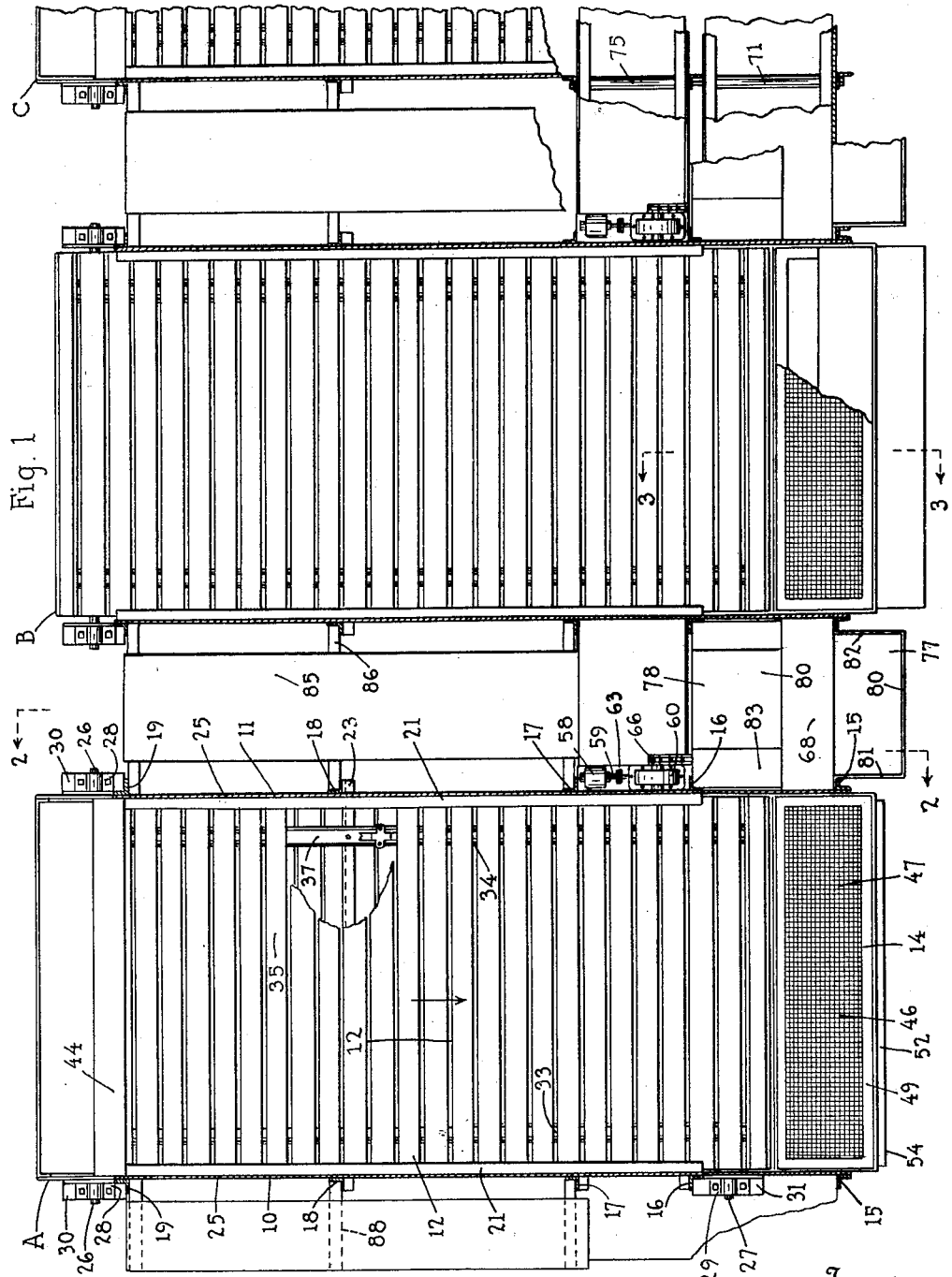
Fig. 1 is a plan view of a sorting device illustrating an application of my invention.

In the use of my invention, I employ a number of spaced parallel sorters A, B, C, etc., which adjoin one another and which are adapted to receive the waste paper at the rear thereof and to discharge the same at the front thereof. In as much as each of these sorters is substantially identical in construction, only sorter A will be described in detail, which is most clearly illustrated in Fig. 2. The sorter A comprises two side walls 10 and 11 between which is mounted an endless carrier 12 of the slatted type. This carrier moves in the direction indicated by the arrow in Fig. 1, and is adapted to be fed through a feeding device 13 and to discharge upon a table 14 at the other end thereof from which an operator stationed in front of said table may readily remove and sort the paper and place the same in suitable bins or receptacles or otherwise dispose of the same.

Each of the side walls of the sorter A consists of a supporting structure comprising a number of uprights 15, 16, 17, 18 and 19 which are preferably of angle iron and are connected together along the lowermost ends thereof by means of a longitudinal angle 20. Another longitudinal angle 21 disposed intermediate the upper and lower portions of the said side walls is connected to the uprights 16, 17, 18 and 19 and serves to further stiffen the same. This angle has another function, as will presently be explained. Similar angles 24 connect the uprights 15 and 16 together. The side walls 10 and 11 of the sorter are connected together by means of a series of transverse angles 22 and 23 attached to the uprights 16, 17, 18 and 19 of which the angles 23 are disposed slightly below the angles 21 and which serve to tie the two side walls 10 and 11 together. Each of these side walls consists of a plate of sheet metal 25 which is securely riveted to the various uprights 15, 16, 17, 18, and 19 and which extends down to the bottom of the angles 21 and 24.

The carrier 12 includes two shafts 26 and 27 which are disposed at the ends of the sorters and which are journalled in bearings 28 and 29. The bearings 28 are supported upon brackets 30 secured to the uprights 19, while the bearings 29 are similarly supported upon brackets 31 secured to the uprights 16. To the shafts 26 and 27 are rigidly secured pairs of sprocket wheels 32 which carry two spaced chains 33 and 34. The links of these chains have attached to them slats 35 which form the carrying surface of the said carrier 12 and serve to support the waste paper deposited thereon. The upper run 36 of the carrier 12 is supported throughout its entire length by means of two channel irons 37 which are placed with the flanges extending upwardly, and which are attached to the transverse frame members 23. The two chains 34 are adapted to ride within the troughs formed by these channels, which serve to hold the upper run of the carrier in planiform position. From an inspection of Figs. 1 and 2, it will be noted that the flanges of the angles 21 are so disposed as to overlie the extreme ends of the slats 35 of the carrier 12. These angles, in conjunction with the channels 37, form a guide whereby up and down movement of the upper run of the conveyor is prevented, and, at the same time, prevent paper from catching at the ends of the slats and clogging the machine. The lower run 38 of the said carrier is supported upon a number of planks 39 which are attached to the cross frame members 22. The slats 35 of the lower run 38 of this conveyor rest directly upon the said planks and serve to prevent the sagging of the lower run of the carrier.

The feeding device 13 consists of a chute 100 which is formed by an inclined plate 40 extending between the sides 10 and 11 of the sorter and above the rearward end of the carrier 12. This plate is provided with flanges 41 by means of which the same is securely riveted to two wing-like members 42 extending outwardly from the plates 25 of the side walls 10 and 11. The paper is fed into the feeding device or chute 13 in any suitable manner. In the preferred form of the invention, I employ a traveling carrier which is indicated in its entirety at 43 and which may be moved from one sorter to the other to feed the waste paper thereon. For the purpose of controlling the feeding of the paper upon the carrier 12, a break 44 is employed which is constructed in the shape of an angle and which extends between the side walls 10 and 11 and is situated immediately above the hopper 13. This break is secured to the uprights 19 by means of brackets 45, and is so disposed as to intercept the fall of the paper from the traveling carrier 43 to the carrier 12. The heavy bales and bundles delivered by the carrier 43 are directly deposited upon the break 44 while the smaller individual pieces of paper pass between said break and the chute where the same are discharged upon the said carrier. In this manner, the feeding of the paper on carrier 12 is controlled so as to prevent jamming, and to prevent injury to the carrier proper.

At the discharge end of the carrier 12 is situated the table 14 previously referred to. This table consists of a perforate top 46 which is formed with a screen 47 secured to an angular frame 48. The top 46 is adapted to be set into an angle iron frame 49 secured to the plates 25 of the side walls 10 and 11, which frame is spaced above the angles 24 connecting the uprights 15 and 16 together. A similar frame 50, disposed at the plane of the angles 24, is connected to the said frame 49 by means of a skirt of sheet metal 51. A bottom 52 is slidably mounted upon the frame 50 and serves, in conjunction with the strip 51, to form a receptacle, indicated at 53, adapted to receive the various substances passing through the screen 47 of the top 46. As the dust and other smaller substances found with the paper passes through the screen 47, the same is collected within the receptacle 53 and there retained until such time as the same is desired to be dumped, which is accomplished by sliding the bottom 52 outwardly through engagement with a depending lip 54 formed on the forward end thereof.

Figures 2, 3:
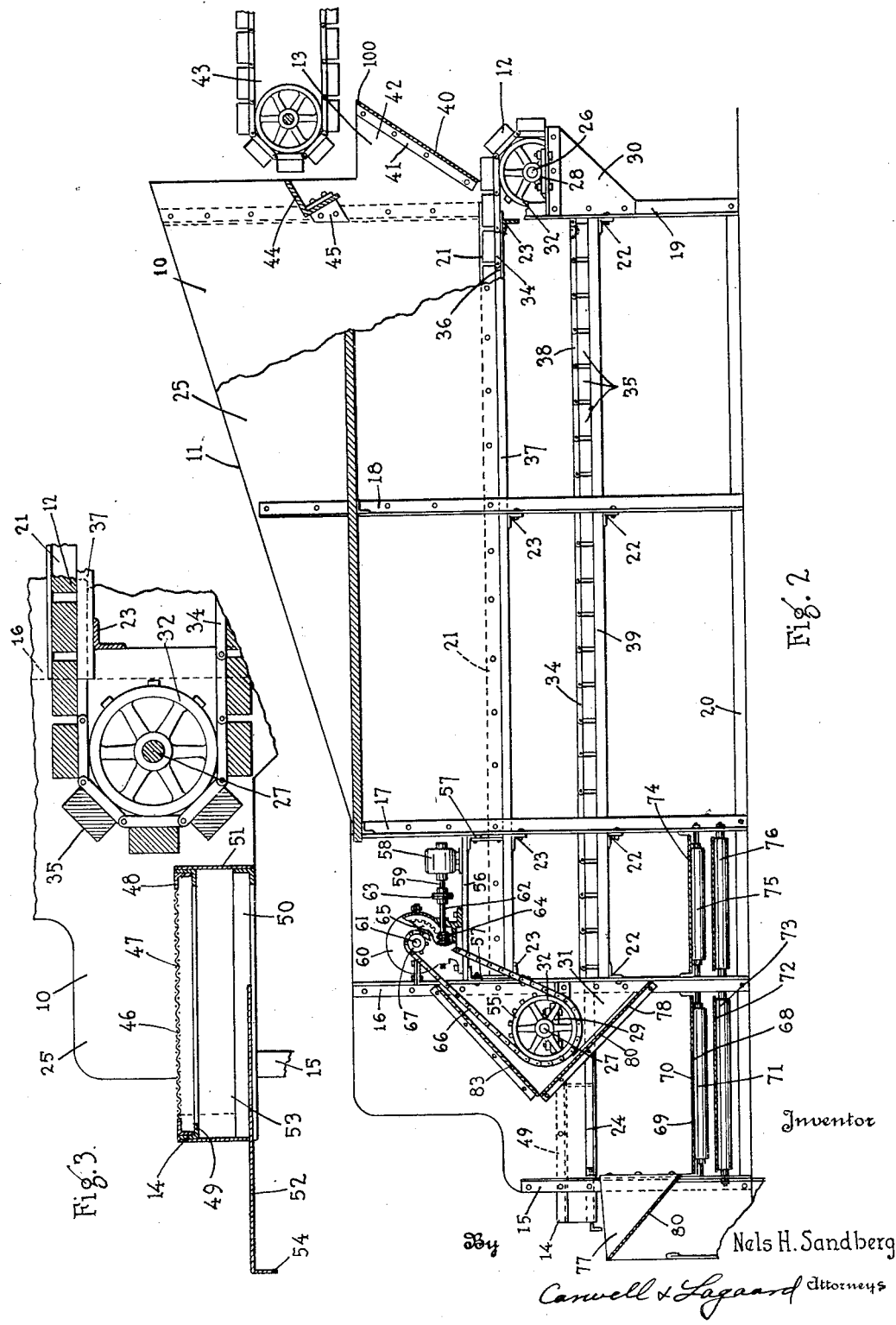
Fig. 2 is a longitudinal elevational sectional view taken on line 2—2 of Fig. 1.
Fig. 3 is an enlarged fragmentary elevational sectional view taken on line 3—3 of Fig. 1.

The carrier 12 is adapted to be driven through a device best shown in detail in Fig. 2. On the side 11 of the sorter, and between the uprights 16 and 17, is arranged a shelf 56 which is supported on two brackets 57 attached to the said uprights. This shelf supports at one end an electric motor 58 which is provided with the usual drive shaft 59. At the other end of this shelf is arranged a transmission case 60 which includes two shafts 61 and 62 journalled in suitable bearings therein and extending at right angles to one another. The shaft 52 is in alignment with and is directly connected to the shaft 59 of motor 58 by means of a coupling 63.

This shaft has keyed to it a worm 64 which meshes with a worm wheel 65 keyed to the shaft 61. Both the worm 64 and shaft 65 are contained within the case 60 and may run in oil or grease as desired. The end of the shaft 27 of carrier 12 protrudes outwardly beyond the side 11 of the sorters and has attached to it a sprocket wheel 55. A chain 66 passes over this sprocket wheel and over a sprocket pinion 67 attached to the protruding end of the shaft 61. By means of this construction, the carrier 12 is given a relatively slow movement upon energizing the motor 58. A suitable electric switch may be installed within reach of the operator which is connected to the motor 58 and which closes the motor circuit and causes the said carrier to travel toward the operator and deposit the paper upon the table 14 where the same may be sorted.

Beneath the table 14 and between the uprights 15 and 16 of the sorter A is disposed a conveyor 68 which travels at right angles to the carrier 12. This conveyor extends similarly beneath the table 14 of all of the sorters A, B, C, etc., and serves to simultaneously remove the sorted paper placed thereon by any of the operators at said respective sorters. This conveyor comprises a belt 69, the upper run 70 of which is supported upon a plurality of rollers 71 mounted between the various uprights 15 and 16, and the lower run 72 of which is mounted upon a number of corresponding rollers 73. This conveyor is of the ordinary type and may be driven in any suitable manner through pulleys or rollers situated at the ends of the same. Such construction being well known in the art is not described in detail in this application. Within the space between the uprights 16 and 17 is similarly positioned a second conveyor 74 which is supported upon rollers 75 and 76 similar to the rollers 71 and 73 mounted between the said uprights. This conveyor runs parallel with the conveyor 69 and in like manner extends below all of the sorters of the group.

For feeding the sorted paper upon the two conveyors 69 and 74, I employ a number of chutes which are disposed between the adjacent walls 10 and 11 of adjoining sorters. Between each of such pairs of walls, I use two chutes 77 and 78 which consist of inclined plates 80 connected by suitable side walls 81 and 82 with the uprights 15 and 16 of the sorters proper. Paper placed between the two plates 80 of the two chutes is directed upon conveyor 69, and paper placed upon the plate 80 of the chute 78 is directed upon conveyor 74. In this manner, the operator may sort the paper and place the same within either of these chutes to be carried away by the respective conveyor associated therewith. To prevent the paper deposited in chute 78 from becoming entangled between the chain 66 and sprockets driven thereby, a guard 83 is employed which is attached to the plate 80 of said chute.

In the operation of the device, an operator is stationed in front of the table 14 of each of the sorters A, B, C, etc. An attendant, through the movable carrier 43, maintains the space within each of the sorters and above the respective carriers thereof filled with waste paper. In response to the control of the operator, the paper upon the carrier 12 is discharged from the said carrier and upon the top 46 of the table 14. The operator then selects the various kinds of paper from the mass and places the same in suitable bins or receptacles. Some of the more frequently occuring grades of paper are directly deposited into the chutes 77 and 78 where the same fall upon the conveyors 69 and 74 and are removed from the sorters and discharge wherever desired. As the sorting continues, the operator progressively advances the carrier 12 toward the table 14 which causes the paper to be delivered upon said table within reach of the operator. As the sorting continues, all of the dirt and smaller particles of waste substances in the paper falls through the perforations in the tops thereof so that the paper is automatically cleaned. At suitable intervals of time, the bottom 52 is slid out of its support in the frame 50 to cause the contents of the receptacle 53 to discharge upon the conveyor 69. At such intervals, the said conveyor is caused to discharge into a suitable bin or receptacle for waste material. If desired, the sorter may be used in conjunction with a distributing device, such as shown in my co-pending application, Serial Number 349,051, or separate receptacles may be employed which may be trucked away by an attendant when filled.

For the purpose of assisting the attendant in inspecting the sorters, and in adjusting bales of paper deposited within the sorters, and for cutting the wire on such bales, I employ a platform 85 between each pair of sorters. This platform is mounted upon beams 86 attached to the uprights 17, 18 and 19, as best shown in Fig. 1. At the end of the machine, brackets 88 may be employed instead of the beams 86 for this purpose.

My invention is highly advantageous in that an extremely efficient and effective device is provided whereby waste paper may be readily and expeditiously sorted with a minimum amount of labor and effort and in a minimum length of time. In my improved invention, several tons of paper may be handled each day by one person without appreciable fatigue. All of the dirt and other smaller particles of foreign matter in the paper is automatically sifted therefrom and may be periodically removed from the sorting device. The chutes leading to the traveling conveyors for removing the sorted waste paper are conveniently accessible and, therefore, only a minimum amount of effort is needed for the disposition of the paper. The work table is placed at a suitable height so that manual fatigue is greatly reduced. The various parts of the sorters are readily accessible and are easily repaired and lubricated so as to render the device highly serviceable.

Changes in the specific form of my invention, as herein disclosed, may be made within the scope of what is claimed without departing from the spirit of my invention.

Having described my invention, what I claim as new and desire to protect by Letters Patent is:

1. A sorting device for waste paper comprising a pair of spaced sorters including parallel carriers, pairs of side walls enclosing said carriers, said side walls being open beneath said carriers at the discharge ends thereof, a conveyor extending beneath said carriers and passing through said side walls, and a chute disposed between adjacent side walls of adjoining carriers and being directed forwardly of said side walls to discharge the sorted paper upon said conveyor.

2. A sorting device for waste paper comprising a pair of spaced sorters including parallel carriers, pairs of side walls enclosing said carriers, said side walls being open beneath said carriers at the discharge ends thereof, a conveyor extending beneath said carriers and passing through said side walls, a chute disposed between adjacent side walls of adjoining carriers and being directed forwardly of said side walls to discharge the sorted paper upon said conveyor, a table at the discharge end of each of said carriers, a second conveyor disposed beneath said tables and extending beneath said side walls in parallel relation to said first named conveyor, and a second chute extending forwardly of said carriers and between said side walls for feeding sorted waste paper upon said second conveyor.

3. A sorting device for waste paper comprising a pair of spaced sorters including parallel carriers, pairs of side walls enclosing said carriers, said side walls being open beneath said carriers at the discharge ends thereof, a conveyor extending beneath said carriers and passing through said side walls, a chute disposed between adjacent side walls of adjoining carriers and being directed forwardly of said side walls to discharge the sorted paper upon said conveyor, a table at the discharge end of each of said carriers, a second conveyor disposed beneath said tables and extending beneath said side walls in parallel relation to said first named conveyor, and a second chute extending forwardly of said carriers and between said side walls for feeding sorted waste paper upon said second conveyor, said table having a perforate top, and means for discharging the substances passing through said top and upon said second conveyor.

In testimony whereof I have affixed my signature to this specification.

NELS H. SANDBERG.